United States Patent

Lovett

[15] 3,705,455

[45] Dec. 12, 1972

[54] REPLACEABLE ROLLER SURFACE FOR CONVEYOR AND APPLICATION TECHNIQUES THEREFOR

[72] Inventor: John R. Lovett, 23604 Lake Road, Village, Ohio 44140

[22] Filed: Jan. 28, 1971

[21] Appl. No.: 110,462

Related U.S. Application Data

[63] Continuation-in-part of Ser. No. 43,349, June 4, 1970, abandoned.

[52] U.S. Cl. ................................................29/234
[51] Int. Cl. ...........................................B23p 19/04
[58] Field of Search ....29/234, 235, 237, 200 B, 252, 29/450

[56] References Cited

UNITED STATES PATENTS

| 894,221 | 7/1908 | Merritt | 29/234 |
|---|---|---|---|
| 216,263 | 6/1879 | Ewing | 29/234 |
| 2,361,026 | 10/1944 | Greene | 29/234 X |
| 2,498,357 | 2/1950 | Breisch | 29/450 |
| 2,645,004 | 7/1953 | Dorner | 29/234 X |

Primary Examiner—Robert C. Riordon
Assistant Examiner—J. C. Peters
Attorney—Isler and Ornstein

[57] ABSTRACT

A resilient tubular sleeve of elastomeric material provided with a plurality of longitudinally-extending circumferentially-spaced cavities inwardly thereof to provide a replaceable surface for a conveyor roller. The cavities provide an intermittent series of compressible wall sections on the sleeve for engagement with and displacement by a conveyor belt in response to axial rotation of the roller to provide a seal cleaning roller surface. The tubular sleeve has a smaller internal diameter, in its unstressed condition, than the diameter of the roller on which it is mounted. The tubular sleeve is mounted on the roller by expanding its internal diameter sufficiently to permit it to slide axially along the roller to the desired position and thereafter permitting it to contact upon the roller surface and resiliently grip it. Improved techniques, tools and devices for effecting the mounting of the tubular sleeve on the roller for disclosed, as well as the utilization of these techniques for deforming the sleeve to provide a self-aligning conveyor roller.

11 Claims, 17 Drawing Figures

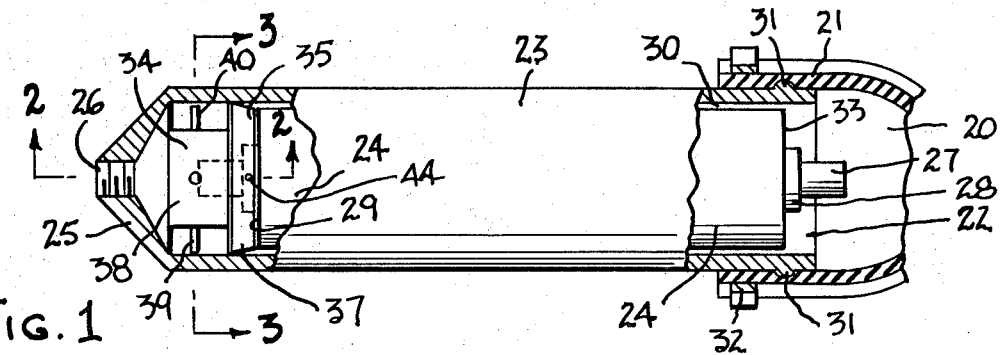
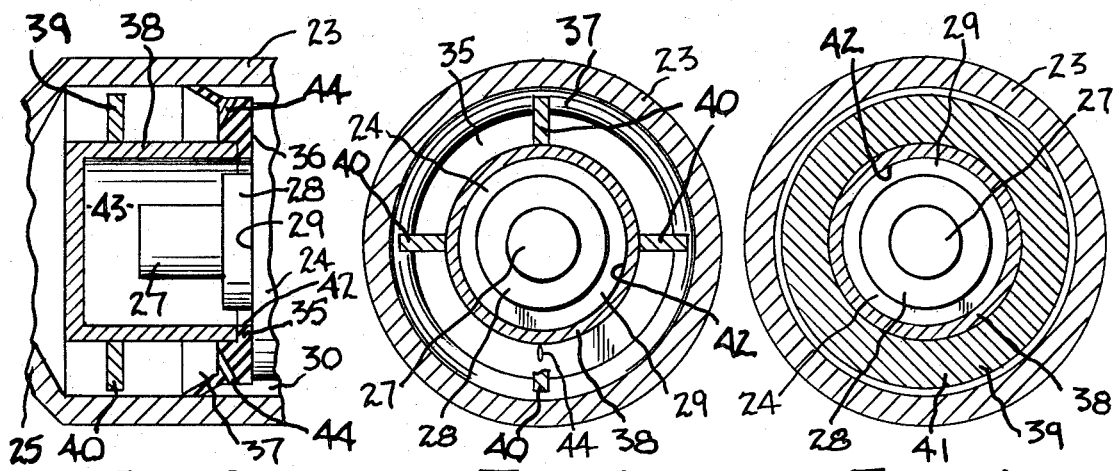
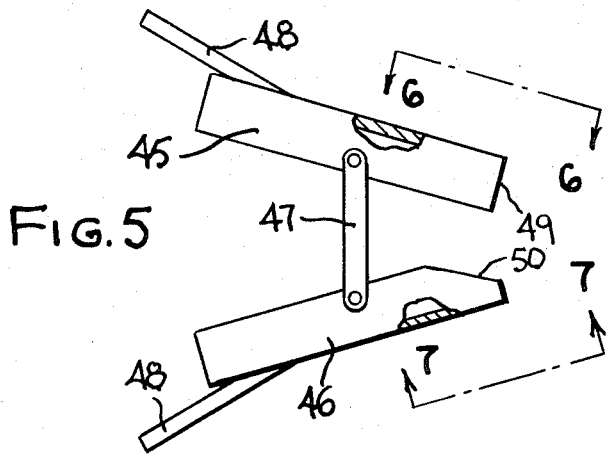
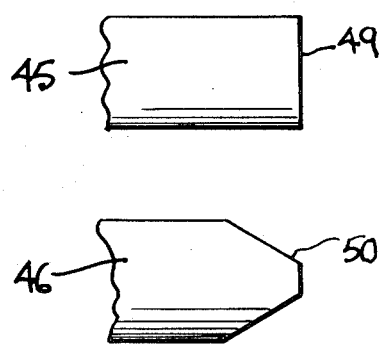
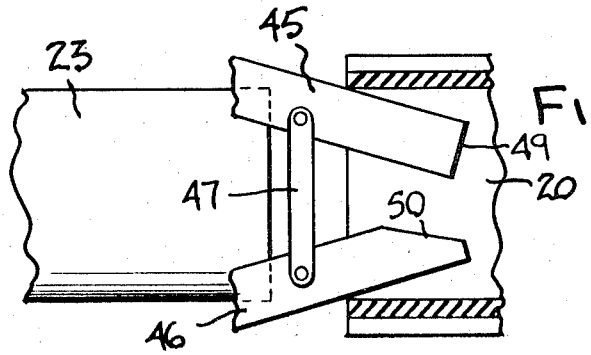
INVENTOR.
JOHN R. LOVETT

INVENTOR.
JOHN R. LOVETT
BY

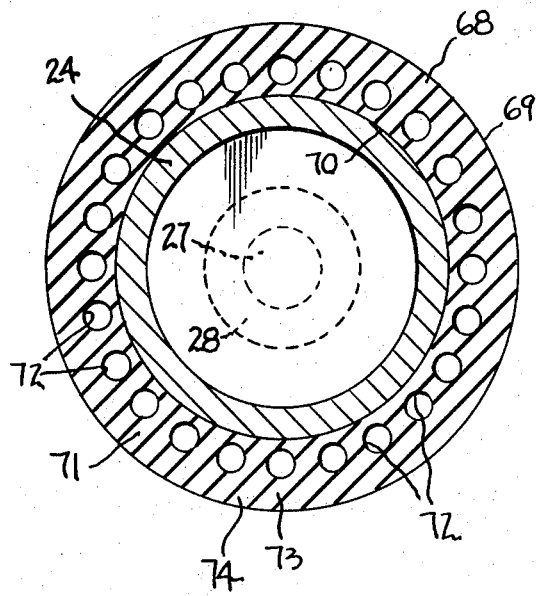
FIG. 13
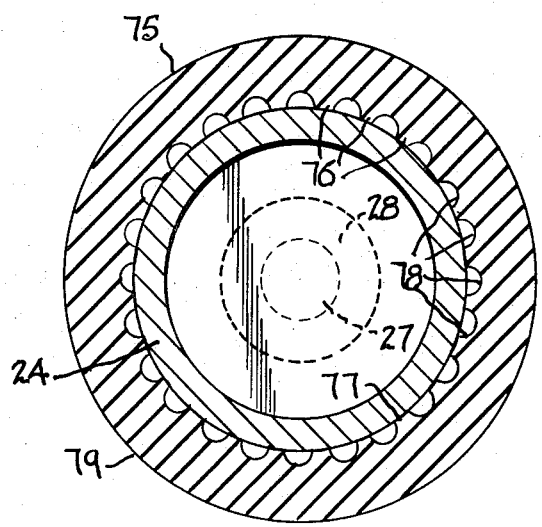
FIG. 14
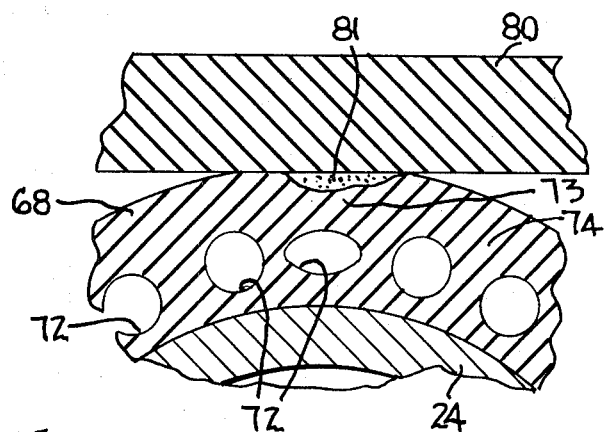
FIG. 15
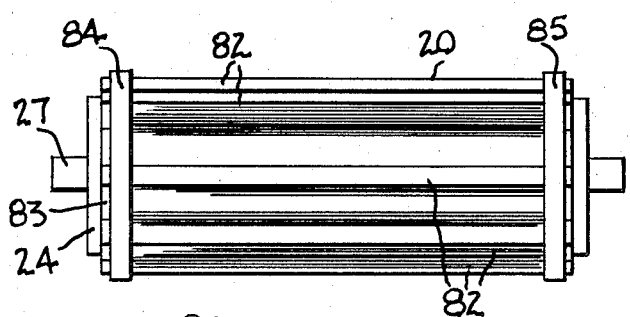
FIG. 16
FIG. 17
INVENTOR.
JOHN R. LOVETT
BY
Dober & Ornstein
attorneys.

REPLACEABLE ROLLER SURFACE FOR CONVEYOR AND APPLICATION TECHNIQUES THEREFOR

CROSS-REFERENCES TO RELATED APPLICATIONS

This application is a continuation-in-part of my co-pending application Ser. No. 43,349 filed June 4, 1970, now abandoned and titled REPLACEABLE ROLLER SURFACE FOR CONVEYORS AND METHOD OF MOUNTING SAME.

BACKGROUND OF THE INVENTION

As indicated more fully in the above-noted co-pending application, the materials, such as sand, gravel, coal, cement, sulfur or other granular materials, which are frequently handled by endless belt conveyors, have a tendency to cling or adhere to the surface of the belt or become encrusted thereon, particularly when there are conditions of high humidity, dampness, snow, rain or freezing. This adherent material is usually highly abrasive and, under moist conditions, may also be highly corrosive. The material adheres to and is carried on the surface of the return flight of the belt as this surface engages and rides upon the underlying support or idler rollers of the conveyor and causes undue abrasion, wear and deterioration of the metal conveyor rollers as well as of the belt itself. Under certain environmental conditions, such adherent material can impair the flexibility of the belt and cause injury to it.

In my aforesaid co-pending application, I have described a resilient, self-gripping, externally ribbed, replaceable tubular sleeve of elastomeric material which will intermittently contact and deform the conveyor belt or break loose the adherent material as the belt passes over the roller, so as to obviate or at least minimize the undesirable adherent condition previously mentioned. The externally-ribbed tubular sleeve also has a self cleaning characteristic.

The sleeve is effective in performing its function and, due to the fact that it is replaceable, it eliminates the expense and cost of replacing an entire conveyor roller, as the sleeve itself is simply and relatively inexpensively removed and replaced when necessary.

Due to the external ribbing of the above-described sleeve, the operation of a conveyor having such a roller surface is usually somewhat noisier than when a smooth-surfaced steel roller is employed. Ordinarily, this noise factor is of no consequence or significance, but under certain circumstances it is desirable that it be curtailed or minimized. It has also been found that improved tools, devices and techniques can be utilized in the mounting of the sleeve on the conveyor roller to eliminate water contamination of the bearings of the roller, as well as to obtain greater control over the relative movement of the roller during the mounting procedure.

SUMMARY OF THE INVENTION

The present invention has several objectives which relate to improvements upon the disclosure of my aforesaid co-pending application, among which are:

The provision of an improved mounting means and technique for controlling the relative movement between the roller and the resilient sleeve, so as to reduce possible hazards as well as to more effectively utilize the available fluid pressure supply.

To provide a replaceable self-gripping resilient sleeve having a smooth external surface for quieter operation, but provided with longitudinally extending inward cavities which will define compressible air pockets or wall sections which will provide a cushioning effect for the belt to reduce impact shocks, as well as providing a self cleaning feature for the sleeve and, to some extent, for the belt.

To provide improved expander tools for initially enlarging the end of the tubular sleeve for securing it to a mounting cylinder.

To provide a technique for deforming and converting an externally longitudinally-ribbed sleeve into a belt-aligning configuration of chevron-shaped ribs.

The above are some of the major objectives of the invention, but other objectives will be disclosed and will become apparent during the course of the following description.

BRIEF DESCRIPTION OF THE DRAWING

FIG. 1 is a view in side elevation of a mounting procedure for a resilient sleeve onto a conveyor roller, utilizing a starting plug for improved and more effective control; portions thereof being broken away to show detail.

FIG. 2 is an enlarged cross-sectional view of a portion of the starting plug, taken as indicated on line 2—2 of FIG. 1.

FIG. 3 is an enlarged cross-sectional view of a portion of the starting plug, taken as indicated on line 3—3 of FIG. 1.

FIG. 4 is a view similar to FIG. 3 but showing a modified form of the starting plug.

FIG. 5 is a view in elevation of a pair of lever expanders for enlarging the end of the tubular sleeve for mounting it on the mounting cylinder.

FIG. 6 is a fragmentary plan view of one of the expander tools, taken in the direction indicated by the line 6—6 on FIG. 5.

FIG. 7 is a fragmentary plan view showing the configuration of the other expander tool and taken in the direction indicated by the line 7—7 on FIG. 5.

FIG. 8 is a fragmentary cross-sectional view showing the method of use of the expander tool.

FIG. 13 is a transverse cross-sectional view of a smoothsurfaced tubular sleeve provided with a form of longitudinally-extending cavities inwardly thereof.

FIG. 14 is a view similar to FIG. 13 but showing another form of smooth-surfaced sleeve with longitudinally-extending cavities inwardly thereof.

FIG. 15 is an enlarged fragmentary cross-sectional view, similar to either FIG. 13 or FIG. 14 and graphically illustrating the manner in which the weakened wall section of either of these forms of tubular sleeve coact with the conveyor belt in performing a cleaning function.

FIG. 16 is a view in side elevation of an externally-ribbed tubular sleeve clamped in position for deformation into a belt-aligning configuration.

FIG. 17 is a view similar to FIG. 16, but showing the chevron-like configuration of the ribs achieved on the tubular sleeve as a result of the deformation.

Figure 9:
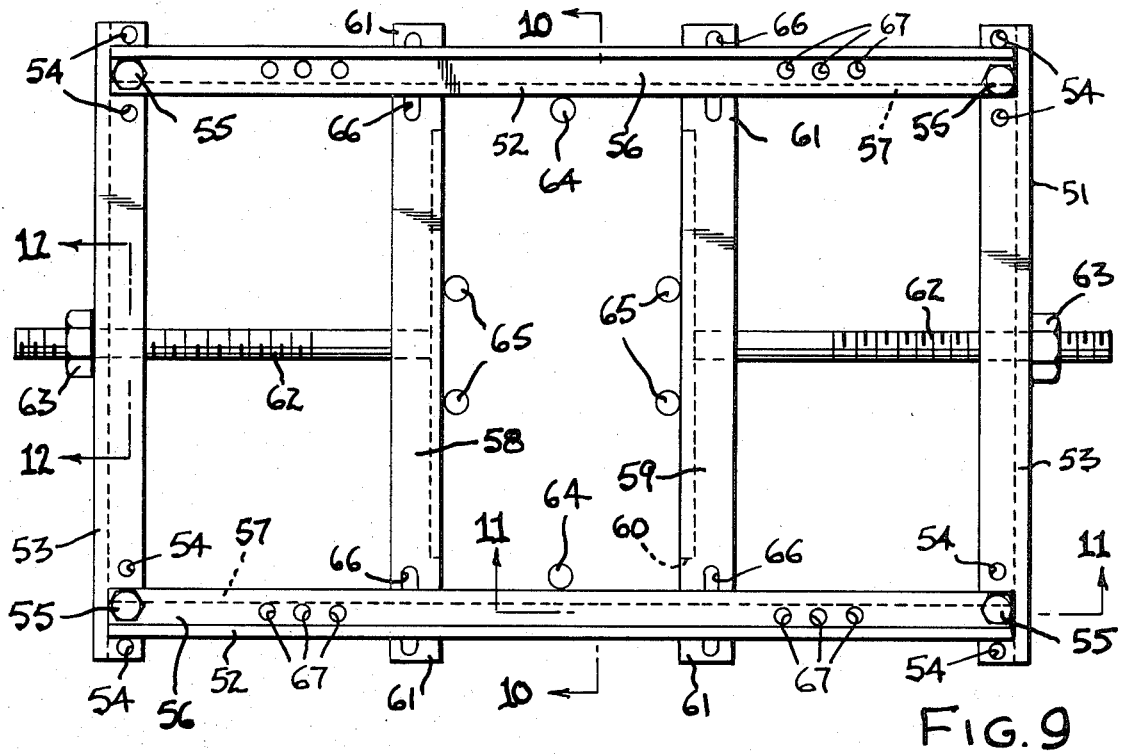
FIG. 9 is a plan view of another form of expander device for expanding the end of the resilient sleeve during and mounting procedure.
Figure 10:
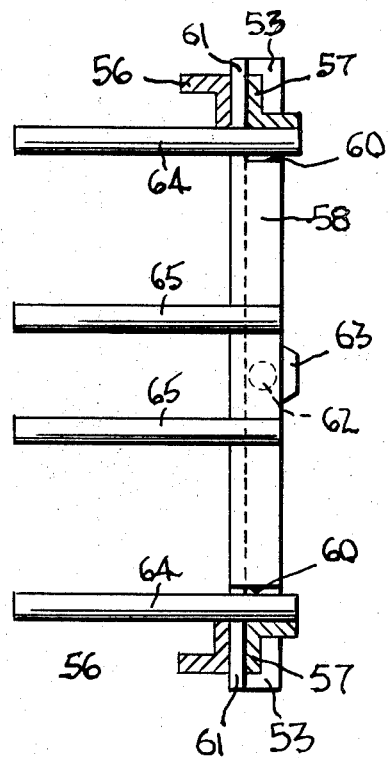
FIG. 10 is a cross-sectional view of the expander device, taken as indicated on line 10—10 of FIG. 9.

For clarity of illustration, wall thickness and other dimensional characteristics of the structures shown in the drawings have been purposely exaggerated in certain aspects.

DESCRIPTION OF THE PREFERRED EMBODIMENTS

Referring more particularly to FIG. 1 of the drawings, there is shown a resilient tubular sleeve or roller surface 20, whose end 21 has been expanded sufficiently to be mounted over the open end 22 of a pressure cylinder 23 which is utilized in mounting the sleeve 20 onto a cylindrical conveyor roller 24 which has previously been slidably inserted or nested within the cylinder 23. The type of tubular sleeve used and the complete details of the mounting procedure employed are disclosed in my aforesaid co-pending patent application which may be referred to for a fuller explanation and whose disclosure is incorporated herein by reference.

The cylinder 23 has its opposite end 25 closed and fitted as at 26 for connection to a fluid pressure source which may be air or water, but which preferably is a conveniently available municipal pressure water supply. Such a municipal water supply will ordinarily provide water under pressures of approximately 50-60 psi which is adequate for the intended purpose.

The conveyor roller 24 is customarily provided with stub shafts 27 projecting axially from opposite ends thereof and journalled in suitable bearings 28. When water pressure is applied to the closed end of the cylinder, the fluid acts upon the adjacent end face 29 of the roller 24 and also passes through the annular clearance space 30 between the surface of the roller and the internal surface of the cylinder for discharge through the open end 22 of the cylinder. The end 21 of the resilient sleeve embraces the open end 22 of the cylinder which is provided with a raised circumferential rib or bead 31 for frictionally securing the end of the sleeve to the end of the cylinder. If necessary or desirable, the securing function of the cylinder bead 31 can be augmented by the use of a circumferential tension clamp 32 on the sleeve.

As the fluid pressure acting upon the end face 29 displaces the roller toward the open end of the cylinder, the opposite end 33 of the roller is brought into abutment with the constricted portion of the interior of the sleeve 20. It is to be noted that in its unstressed condition the internal diameter of the sleeve 20 is less then the external diameter of the roller 24. The abutment of the end of the roller with the sleeve forms a movable seal which prevents substantial discharge of the pressure fluid through the open end of the cylinder and causes pressure to build up in the annular clearance space 30. As the pressure builds up, it tends to break the seal between the sleeve and the end 33 of the roller by expansion of the sleeve adjacent to the seal. As the sleeve expands in this incremental fashion, the roller is axially displaced further into the sleeve until the operation is completed. This is the mounting procedure described in my aforesaid co-pending application. It will be noted that this procedure causes the immersion of one end of the conveyor roller in water in the cylinder, with consequent removal or corruption of the bearing lubricant as well as aggravating the possibility of corrosion or rusting of the bearings after the roller has been removed. This procedure also requires a relatively high volume of water as there is a constant discharge of water from the open end of the cylinder during the mounting procedure. When a municipal water supply is used, the volume of water employed is ordinarily of no great consequence. However, the endless belt conveyors are sometimes located remote from municipal water supplies and utilize a scarce supply of water which is pumped under pressure to the point of use. In those situations, when on-site mounting of the sleeve on the conveyor roller is required, the volume of water used becomes a significant consideration.

In order to overcome the aforesaid problems, the previously described mounting technique has been modified by introducing the use of a starter plug 34. The starting plug includes a molded flexible ring 35 of elastomeric material, which presents a diametrically extending or annular forward sealing surface 36 for sealing abutment with the end 29 of the conveyor roller. The ring 35 is provided with an angularly directed flange portion 37 which extends rearwardly and outwardly from the periphery of the sealing surface 36 into wiping and sealing engagement with the internal wall of the cylinder 23. The diameter of the sealing surface 36 is less than the internal diameter of the cylinder 23.

Affixed to and extending co-axially rearwardly of the ring 35 is a cylindrical body portion 38 which presents radially-extending guide means 39, spaced rearwardly of the ring 35 and adapted for abutment with the internal wall surface of the cylinder. As best seen in FIG. 3, the guide means are here shown as a plurality of radially-extending circumferentially-spaced fingers or projections 40 whose abutment with the cylinder tends to maintain the starting plug in coaxial alignment with the cylinder during the operative movement thereof. In a modified form of starter plug illustrated in FIG. 4 of the drawings, the guide means is shown in the form of a disk 41 which serves the same function as the fingers 40.

Preferably, the forward sealing surface 36 is provided with a central opening 42 which communicates with the hollowed-out interior of the body 38, thereby providing a receptacle 43 which accomodates the stub shaft 27 and bearing 28 of the adjacent end of the roller and isolates these axially-projecting portions of the roller from exposure to water when the forward sealing surface 36 is in abutment with the end 29 of the roller. This sealing abutment is effected at the time that the roller is inserted into the cylinder, the starting plug 34 having been previously inserted in position to make sealing contact with the end of the roller.

One or more fluid passageways 44 are provided on the ring 35 to provide fluid communication from the pressure side or rearward face of the ring 35 to a point forwardly of the peripheral seal provided by the flange 37 and radially outwardly of the seal with the end of the roller provided by the forward sealing surface 36. The number and size of these fluid passageways will relate to the size or diameter of the sleeve and its relationship to the diameter of the roller upon which it is to be mounted. The fluid passageway of passageways 44 provide a means for metering the volume of fluid which is permitted to by-pass the peripheral seal 37 and enter the annular clearance space 30 for utilization in expanding the constricted portion of the sleeve 20. By utilizing one or more of these fluid-metering passageways, the use of an excessive volume of pressure fluid is avoided and the pressure force of the fluid is conserved for more effective and efficient axial displacement of the roller into the sleeve.

The fluid pressure acts directly upon the pressure faces presented by the rearward surfaces of the starter plug 34 which is in sealing abutment with the end of the roller and, in response to the pressure force, causes axial displacement of the roller relatively to the cylinder and to the sleeve connected thereto. Only a small amount of the fluid by-passes the starting plug through the metering passageways 44 to provide an anti-friction cushion between the roller and the cylinder and sleeve and to provide the necessary expansion force for the sleeve where it engages the end of the roller. When the roller has been displaced fully into the sleeve, the fluid pressure is relieved and the sleeve is disconnected from the cylinder so as to contract into gripping relationship with the roller. If any trimming of the ends of the sleeve is required, it can be accomplished at this time.

Referring now to FIGS. 5–8 of the drawings, there is illustrated a pair of lever expanders, one of which is a squared-edge expander 45 and the other of which is a beveled-edge expander 46, interconnected with each other by a pair of pivot links 47 which acts as a fulcrum intermediate the ends of the lever expanders. Both of the expanders 45 and 46 have a substantially semispherical cross-section of a radius which is approximately the same as or at least as great as the radius of the cylinder 23 or the cylindrical conveyor roller 24, as the case may be, depending upon whether the sleeve 20 is originally expanded to fit over the end of the roller directly when that method of mounting is used as described in the aforesaid co-pending application, or to fit over the end of the cylinder, as described herein. Inasmuch as the unstressed diameter of the sleeve is ordinarily about 10 percent less than the diameter of the roller upon which it is to be mounted, it is necessary that one end of the sleeve be mechanically stretched or expanded to initially start it upon and connect it to the open end of the cylinder 23, when this method is employed for mounting the sleeve on the roller. A convenient method of accomplishing this is to utilize the described pair of expanders 45 and 46.

The expanders are inserted into the end of the sleeve 20 and the inserted ends are forced apart by applying manual pressure to the handles 48 which are affixed to the convex external surfaces of the lever expanders and project to a point rearwardly of the fulcrum to a greater distance than the inserted ends extend forwardly of the fulcrum, so as to provide a mechanical advantage in effecting expansion of the end of the sleeve. As the sleeve is sufficiently expanded, it is drawn over the end of the cylinder together with the lever expanders, until a sufficient length of the sleeve overlies the end of the cylinder to provide an adequate frictional gripping or clamping surface for connection to the cylinder. The lever expanders are then withdrawn and either the previously described cylinder bead 31 or the clamp 32 is relied upon for securing the sleeve to the cylinder.

It will be noted that the expander 45 is provided with a squared edge 49, whereas the expander 46 is provided with a beveled or tapered edge 50. This distinction in the forms of the edges of the expanders is not of great significance when the expanders are coupled to each other by the pivot links 47 and are utilized in that form. However, in lieu of using the pivot links 47 as a fulcrum for the pair of expanders, it is frequently desirable to eliminate the pivot links and utilize the edge of the end of the cylinder as the fulcrum for the lever expanders. In such case, the squared-edge expander 45 is first inserted into the end of the sleeve and this expander is then placed upon the end of the cylinder with the sleeve partially drawn up thereon. The second expander 46 is now inserted in the end of the sleeve, opposite the expander 45, and the beveled-edge 50 facilitates this insertion now that the end of the sleeve is under some stress. Both expanders 45 and 46 now utilize the end of the cylinder as a fulcrum and the inserted ends are spread apart to expand the end of the sleeve in the manner previously described. After the end of the sleeve has been moved onto the cylinder a sufficient distance for securement, the expanders 45 and 46 may be individually withdrawn. This technique is shown in FIG. 8 of the drawings.

Another, more effective means for effecting this initial expansion of the end of the sleeve, is illustrated in FIGS. 9–12 of the drawings. The expander device includes a rectangular frame 51 formed of spaced longitudinally-extending angle iron rails 52, rigidly connected at their opposite ends by angle iron tie elements 53. It will be noted that the ends of the tie elements 53 are provided with a plurality of spaced openings 54 for accommodating the bolts 55 which serve to secure the rails to the tie elements. By selecting the appropriate openings 54, the spacing between the parallel rails 52 can be adjusted in relation to the size of the sleeve and cylinder or conveyor roller for which the expander device is specifically to be used. Ordinarily, the sleeves 20 will be made in several stock sizes for different sized conveyor rollers, such as for example 4 inches, 5 inches and 6 inches in diameter.

It will be noted that each of the rails 52 consists of an upper angle iron element 56 and a lower angle iron element 57 which are maintained in face-to-face spaced relationship to each other by the intervening tie elements 53 which are sandwiched therebetween. This clearance space provides a track for the horizontal leg of an angle iron cross-member 58 and cross-member 59 whose vertical leg portions have been removed or cut away adjacent the ends of the cross-members, as at 60, to leave the horizontally extending tongue or glide sections 61 on the ends of each cross-member. Either one or both of these cross-members is arranged so as to be movable in a fore and aft direction in the track provided between the upper and lower sections of the longitudinally-extending rails 52. The movable cross-member has a screw-threaded element 62 coupling it to a tie element 53. Although various means of accomplishing this are possible, I have here shown the threaded element 62 affixed to the cross-member centrally thereof, as by welding, and extending in parallel to the rails 52 to traverse the tie element 53. A take-up nut 63 is mounted on the free end of the element 62 and causes displacement of the element 62 and its attached cross-member 58 or 59 in a direction toward the tie element 53.

An upstanding finger or rod 64 is secured to each of the rails 52 at the approximate mid-point thereof. These spaced fingers 64 effect the initial diametrical expansion of the sleeve in one direction of axis when the sleeve is initially placed over the spaced fingers. The expansion of the end of the sleeve in its other axis or direction is accomplished by two pairs of fingers or rods 65, one pair being mounted on each of the cross-members 58 or 59 inboard of the fingers 64. When the take-up nut 63 is manipulated, it causes retraction of the cross-members 58 and 59 relatively to each other, thus expanding the end of the sleeve 20, which is mounted over the fingers 64 and 65, to a sufficient size to accommodate and slide over the end of the conveyor roller or cylinder, as the case may be. The roller or cylinder is inserted between the spaced cross-members, after they have been retracted sufficiently, into engagement with the expanded end of the sleeve. The expansion device is then withdrawn from the sleeve and slid over the body of the cylinder to remove it.

This described form of expansion device provides a considerably greater mechanical advantage than it is feasible to obtain with the previously described expanders 45 and 46 and is thereby easier to use, although somewhat more complex in arrangement. It will be understood that other means of coupling the cross-member or cross-members to the tie elements for relative movement could be utilized. The use of a hydraulic cylinder as the coupling means in lieu of the screw-threaded element 62 and nut 63 is contemplated when the mounting procedure for the sleeve takes place in a location where hydraulic pressure lines or hydraulic pumps are readily available. Where such facilities are not available and mechanical means must be relied upon, it will be understood that the previously described principle of screw-threaded mechanical advantage could also be applied by using a common screw-threaded element threadedly engaging both the cross-members 58 and 59 and having screw threads of opposite hand engaging each of the cross-members respectively so that rotation of the screw-threaded member in one direction would cause relative displacement of the cross-members 58 and 59 in opposite directions. Other modifications of this principle will be apparent to those skilled in the art.

Figure 11:
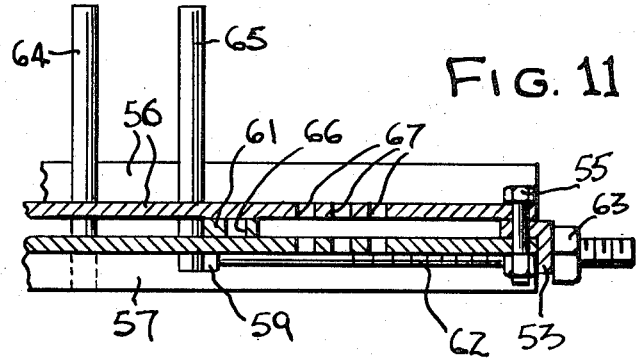
FIG. 11 is a fragmentary cross-sectional view of the expander device, taken as indicated on line 11—11 of FIG. 9.
Figure 12:
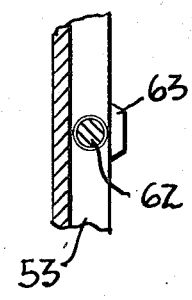
FIG. 12 is another fragmentary cross-sectional view, taken as indicated on line 12—12 of FIG. 9.

As best seen in FIG. 11 of the drawings, the tongues or ears 61 of each of the movable cross-members is provided with a slot 66 which is adapted to be brought into alignment with one or the other of a plurality of openings 67 which are provided in each of the rails 52. When it is desired to lock the expander device in its expanded position, any suitable form of pin or rod is passed through the aligned slot 66 and selected opening 67 in the chosen position of expansion, thereby preventing relative movement between the cross-members and the rails, even though the retractive force on the cross-members is removed or relieved.

In my aforesaid co-pending application, I have disclosed a resilient sleeve of elastomeric material which is provided with a series of circumferentially-spaced external longitudinally-extending ribs to provide a self cleaning action for the roller surface as well as to provide a means for dislodging or removing material which adheres to the underside of the conveyor belt. The external ribs make intermittent linear contact with the underside of the belt in response to axial rotation of the conveyor roller and create a rumble or noise which is not desirable under certain circumstances or locales of conveyor use. Such noise or rumble is minimized when smooth-surfaced rollers or smooth-surfaced roller sleeves are utilized, but the attendant advantages obtained through the use of the externally-ribbed sleeve are also lost with smooth-surfaced roller operation. However, it has been found that the advantages of the ribbed sleeve construction can be retained and the noise level can be minimized by utilizing smooth-surfaced sleeves of novel cross-sectional form as shown in FIGS. 13–15. FIG. 13 is a cross-sectional view of an elastomeric sleeve 68 having a smooth outer surface 69 and a smooth inner surface 70. The wall 71 of the sleeve is provided with a plurality of longitudinally-extending cavities or passageways 72 which are circumferentially spaced from each other and are not exposed to the outer surface 69 of the sleeve. These longitudinally-extending cavities or voids 72 provide circumferentially spaced intermittent compressible or weakened wall sections in the sleeve 68 which have a multiple function.

As a result of the spaced compressible wall sections, the wall of the sleeve does not have a uniform deformation characteristic. The compressible wall sections will be formed under load to a greater extent than the intervening wall sections which are non-compressible. For clarity of description, the compressible wall sections have been designated by the reference numeral 73 and the non-compressible wall sections are designated by the reference numeral 74. When there is adherent material on the underside of the belt that is passing over the conveyor roller, it will, as indicated in FIG. 15, cause compression of the wall section 73 much more readily than it will cause deformation of the wall section 74. The consequent effect is to transform the normally smooth surface of the sleeve 68 into the equivalent of the external longitudinally-ribbed surface heretofore described, with the compressible wall sections 73 defining the spaced valleys which form the upstanding ribs 74. However, this transformation of the smooth surface into the equivalent of an externally-ribbed surface only occurs when there are clumps of adherent material on the underside of the conveyor belt to create this uneven loading of the sleeve. Thereby, the configuration of the sleeve 68 provides the advantages of substantially noise-free smooth surface operation under most operating conditions, and the advantage of the externally-ribbed construction in response to uneven loading resulting from the presence of adherent material on the conveyor belt.

In addition to providing for removal of adherent material from the conveyor belt, the sleeve 68 also has a self-cleaning function as a consequence of its flexing of the compressible wall sections 73. Additionally, the compressible cross-sectional character of the sleeve 68 has an improved impact cushioning characteristic which is of great benefit in absorbing and cushioning load impact which might prove damaging to the belt, particularly at the loading point.

It is preferred that the cavities or voids 72 be located closer to the inner surface 70 than to the outer surface 69 of the sleeve 68. By locating the voids substantially inwardly of the outer surface of the sleeve, the useful life of the sleeve is enhanced, as the surface of the sleeve will have considerably more time and usage in which to wear down before exposing the cavities 72.

In FIG. 14 of the drawings, I have shown a modified cross-sectional form of sleeve 75 provided with longitudinally-extending ribs 76 which project inwardly from the inner surface 77 of the sleeve to provide intervening voids or cavities 78. As in the form of FIG. 13, the outer surface 79 of the sleeve 75 is smooth, but there are circumferentially-spaced compressible wall sections developed in the wall by the voids 78. In the process of mounting the sleeve 75, an appropriate fixture would be utilized to seal off the internal voids or valleys 78 to permit pressure build-up for mounting purposes.

The wall 71 shown in FIG. 15 of the drawings could be the wall of either the sleeve 68 or the sleeve 75 as its functional characteristics would be essentially the same for either sleeve. FIG. 15 shows a conveyor belt 80 with adherent material 81 passing over the smooth surface of the sleeve 68 or 75 and compressing the weakened wall section adjacent to the void to create a surface on the sleeve which is functionally equivalent to the externally longitudinally-ribbed surface, as described above.

The sleeves herein described and described in aforesaid co-pending application are preferably unitary extrusions of rubber or other elastomeric material. This method of manufacture lends itself to high production, is relatively inexpensive and produces a uniform and highly reliable product. However, it requires uniformity of cross-section throughout the length of the product. At times, it is desirable, for example with the externally-ribbed sleeve 20, to arrange the ribs in a chevron effect to provide self-aligning roller-belt action. FIGS. 16 and 17 of the drawings show a technique for accomplishing this result with the extruded sleeve 20.

In FIG. 16, the sleeve 20 is shown with the conveyor roller 24 fully projected therein. Ordinarily, at this point in the mounting operation, the secured end 21 of the sleeve would be detached from its clamped engagement with the cylinder and the internal pressure on the sleeve would be relieved so as to permit the sleeve to contract into gripping relationship with the conveyor roller. In order to provide a belt-aligning roller surface, it is necessary that the central portion of the sleeve 20 be displaced circumferentially in relation to the ends of the sleeve so that the longitudinally-extending external ribs 82 are displaced to form a chevron pattern.

As shown in FIG. 16 of the drawings, to accomplish this, the unsecured end 83 of the sleeve 20 is clamped into its final position on the roller, as by clamp 84, while pressure is still maintained on the interior of the sleeve. Another clamp 85 secures the opposite end of the sleeve to the roller, so that the clamp 32 can now be loosened and the sleeve withdrawn from the cylinder 23 without loss of entrapped pressure.

With the use of a suitable torque-applying tool, the central portion of the still-expanded sleeve is twisted in the desired direction and to the desired extent while the ends of the sleeve and roller are retained against corresponding movement. When the desired extent of displacement of the central portion of the sleeve has been attained, the pressure within the sleeve is relieved so that the sleeve contracts into gripping relationship with the roller in the established chevron pattern. The clamps can then be removed and the ribbed pattern of the surface of the sleeve 20 then appears as illustrated in FIG. 17 of the drawings. When the conveyor roller is mounted so that the apex 86 of the chevron pattern is directed toward the direction of travel of the overlying conveyor belt, the angularly-directed ribs tend to maintain the belt aligned with the roller and prevent it from running off to one side or the other. Additionally, the chevron effect modulates the abrupt line contact of the longitudinally-ribbed sleeve with the belt and thus tends to diminish the noise problem previously mentioned.

Although the creation of the chevron pattern has been described as requiring the clamping of the two ends of the sleeve to the roller prior to withdrawal of the expanded end 21 of the sleeve 20 from the cylinder 23, it will be understood that another technique is to retain the secured end 21 on the cylinder and eliminate the need for use of the second clamp 85. The end 83 of the sleeve would be clamped by clamp 84, as previously described, and the central portion of the sleeve would be displaced to create the chevron effect while the ends 21 and 83 of the sleeve are retained against movement. After the desired chevron pattern has been attained, the pressure on the sleeve is relieved and the clamps 32 and 84 are withdrawn, in the manner previously described. In my co-pending patent application, I have described sleeve mounting techniques which either permit the mounting of the sleeve directly onto the conveyor roller or, alternatively utilize a cylinder 23 as an auxiliary or aid in the mounting procedure. The technique employed for creating the chevron pattern on the surface of the sleeve, would depend upon which of these two mounting techniques were employed.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In combination with a fluid pressure cylinder for mounting an expandable tubular sleeve on a roller, a starting plug slidably mounted within said cylinder for axial displacement therein in response to fluid pressure applied thereto, a radially disposed forward sealing surface on said plug for engaging one end of a roller nested in said cylinder, a peripheral sealing surface on said plug for engaging the wall of said cylinder to cause fluid pressure build-up in said cylinder rearwardly of said plug, and at least one fluid-metering passageway traversing said plug and having a forward discharge port outwardly of said forward sealing surface, whereby to direct fluid under pressure toward the opposite end of said roller.

2. A combination as defined in claim 1, wherein said forward sealing surface is annular and defines a central opening, and a receptacle communicating with said opening and extending rearwardly thereof to receive axially projecting portions of said roller.

3. A combination as defined in claim 1, wherein said forward sealing surface is of lesser diameter than the internal diameter of said cylinder, and said peripheral sealing surface comprises a peripheral flange extending rearwardly and outwardly from said forward sealing surface into wiping engagement with said cylinder wall.

4. A combination as defined in claim 1, wherein said sealing surfaces are formed of resilient material.

5. A combination as defined in claim 1, including radially-extending guide means provided on said plug and spaced rearwardly of said peripheral sealing means for engaging said cylinder and maintaining said plug in substantial coaxial alignment therewith.

6. A combination as defined in claim 5, wherein said guide means comprise a plurality of circumferentially-spaced radial projections.

7. A combination as defined in claim 5, wherein said guide means comprises a disk.

8. A starting plug for use with a fluid pressure cylinder in mounting an expandable tubular sleeve on a roller, comprising a forward sealing surface on said plug adapted for engagement with the end of a roller, a flexible peripheral sealing surface on said plug for wiping engagement with the wall of a cylinder, and at least one fluid-metering passageway traversing said peripheral seal and having an exit port outwardly of said forward sealing surface, whereby to direct fluid-pressure toward the opposite end of the roller.

9. In an apparatus for mounting an expandable tubular sleeve on a cylindrical roller of greater diameter than said sleeve, the combination of a fluid pressure cylinder of greater diameter than the roller, said cylinder having communication with a pressure source at one end thereof and being open at its opposite end to receive a roller slidably therein, a starting plug slidably mounted in said cylinder in sealing engagement therewith and presenting a sealing surface to an adjacent end of the roller, spreader means engageable with one end of the sleeve for spreading said end into overlying relationship with said open end of said cylinder, retaining means for securing said one end of the sleeve frictionally to the cylinder, and a pressure face on said starting plug exposed to said pressure source, whereby said starting plug will axially displace said roller into said sleeve in response to fluid pressure supplied to said cylinder.

10. A combination as defined in claim 9, wherein said retaining means comprises a circumferential rib projecting from the external surface of said cylinder adjacent said open end thereof and engageable with said spread end of the sleeve.

11. A combination as defined in claim 9, wherein said retaining means comprises a circumferential clamp member engageable with said spread end of the sleeve when said sleeve is in said overlying relationship to said cylinder.

* * * * *